United States Patent
Nakamura et al.

(10) Patent No.: US 8,582,435 B2
(45) Date of Patent: Nov. 12, 2013

(54) WIRELESS NODE

(75) Inventors: Hajime Nakamura, Saitama (JP);
Yasuhiko Hiehata, Saitama (JP);
Hideyuki Koto, Saitama (JP)

(73) Assignee: KDDI Corporation, Tokyo (JP)

( * ) Notice: Subject to any disclaimer, the term of this patent is extended or adjusted under 35 U.S.C. 154(b) by 468 days.

(21) Appl. No.: 13/049,193

(22) Filed: Mar. 16, 2011

(65) Prior Publication Data

US 2011/0228675 A1 Sep. 22, 2011

(30) Foreign Application Priority Data

Mar. 19, 2010 (JP) ................................. 2010-064100

(51) Int. Cl.
*H04J 3/14* (2006.01)
*H04J 1/16* (2006.01)
*H04L 12/50* (2006.01)
*H04L 12/28* (2006.01)

(52) U.S. Cl.
USPC ......... 370/235; 370/380; 370/389; 370/395.1

(58) Field of Classification Search
USPC ................................ 370/235, 380, 395.1, 389
See application file for complete search history.

(56) References Cited

U.S. PATENT DOCUMENTS

2004/0202158 A1* 10/2004 Takeno et al. ................. 370/389

FOREIGN PATENT DOCUMENTS

| JP | 60-197058 | | 10/1985 |
|---|---|---|---|
| JP | 60197058 A | * | 10/1985 |
| JP | 2003169363 | | 6/2003 |
| JP | 2005-033814 | | 2/2005 |
| JP | 2005033814 A | * | 2/2005 |
| JP | 2006-033490 | | 2/2006 |
| JP | 2006033490 A | * | 2/2006 |
| JP | 2007-295249 | | 11/2007 |
| JP | 2007295249 A | * | 11/2007 |
| JP | 2010226342 | | 10/2010 |

OTHER PUBLICATIONS

"Part 11: Wireless LAN Medium Access Control (MAC) and Physical Layer (PHY) Specifications Amendment 8: Medium Access Control (MAC) Quality of Service Enhancements", IEEE Std. 802.11e™-2005; Nov. 11, 2005; 211 pages.
Japanese Office Action from JP 2010-064100, dated May 29, 2013.
Translation of Japanese Office Action from JP 2010-064100, dated May 29, 2013.

* cited by examiner

*Primary Examiner* — Andrew Lai
*Assistant Examiner* — Albert Shih
(74) *Attorney, Agent, or Firm* — Westman, Champlin & Kelly, P.A.

(57) ABSTRACT

A module transmits a request for line connection to a module at a communication time notified from a module. The module proceeds to line connection processing in response to the request for line connection and notifies the module of success or failure of line connection. The module notifies a log database of the notified success or failure of line connection. The log database records success or failure of line connection in a database as log data and notifies the module of the log data at predetermined time intervals. The module revises a communication time based on the log data and notifies the module of the revised communication time.

5 Claims, 4 Drawing Sheets

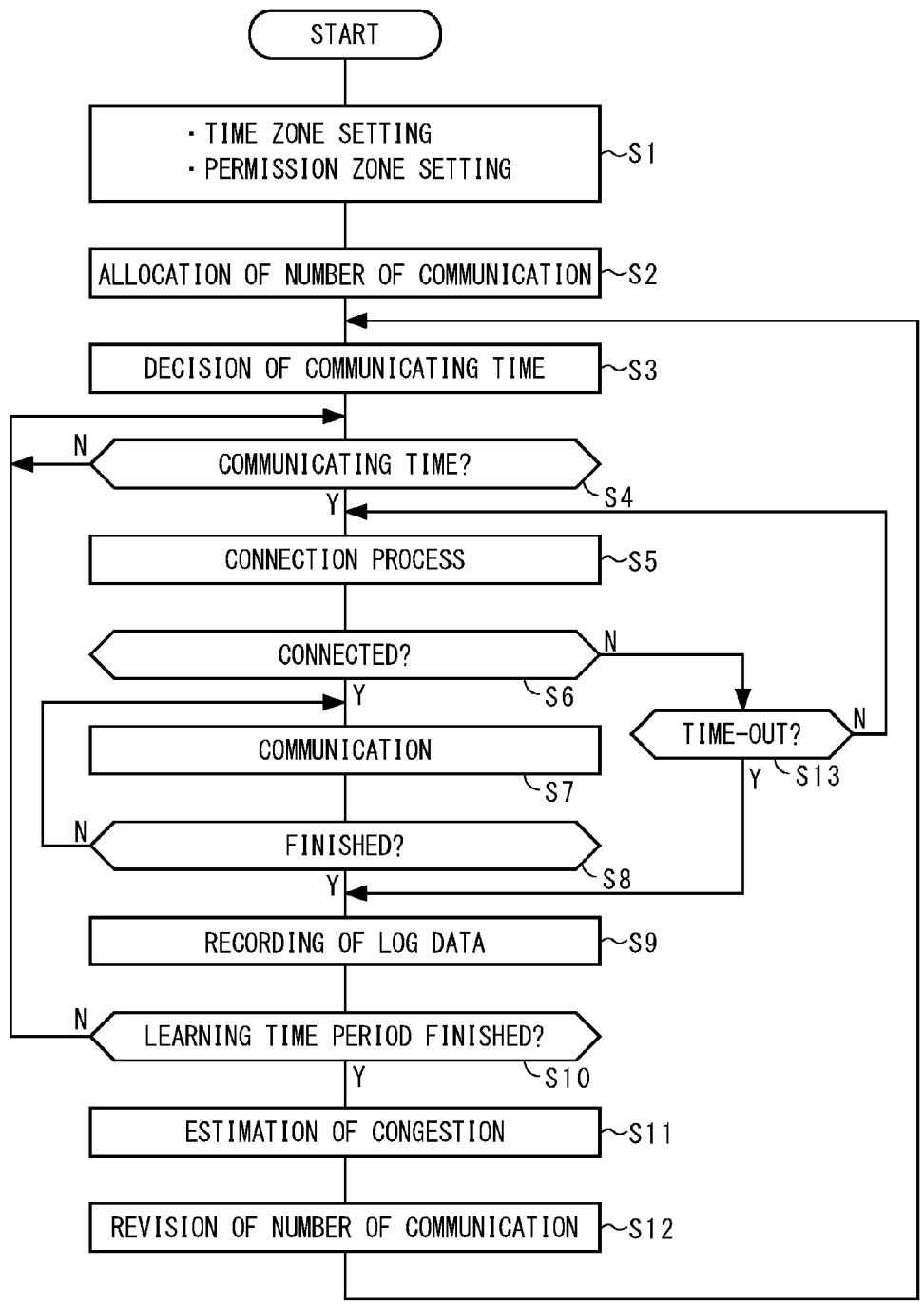

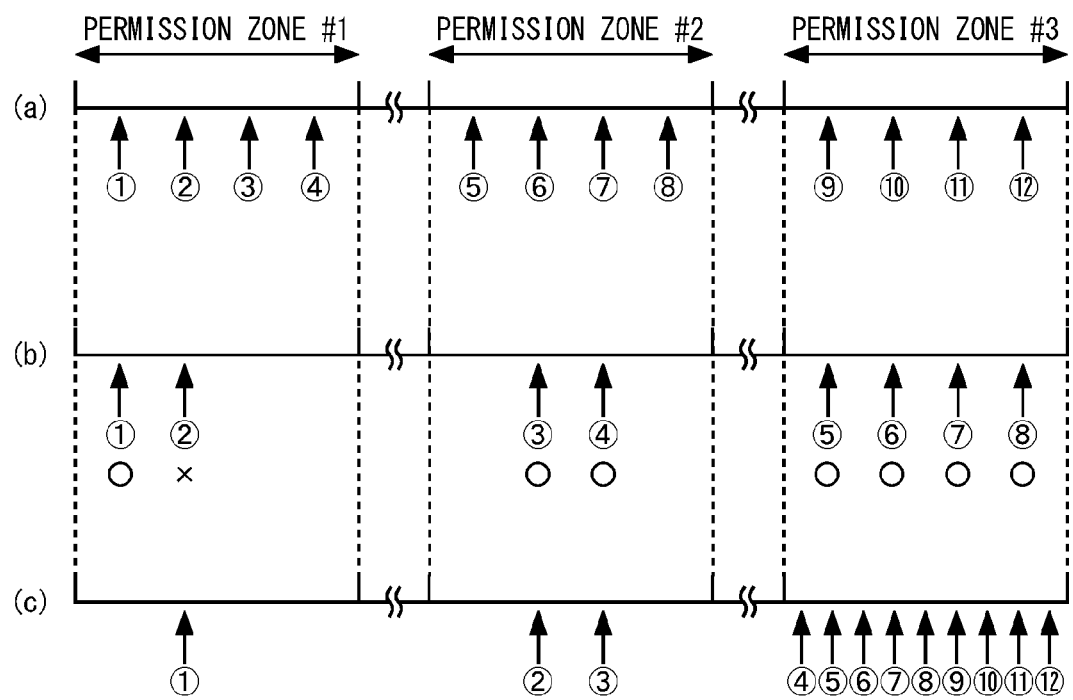

WIRELESS NODE

The present application is claims priority of Japanese Patent Application Serial No. 2010-064100, filed Mar. 19, 2010, the content of which is hereby incorporated by reference in its entirety.

BACKGROUND OF THE INVENTION

1. Field of the Invention

The present invention relates to a wireless node that learns a time zone where there are sufficient wireless resources in an autonomous distributed manner and sets dynamically a communication time at this time zone thereby to carry out time-division transmission and reception of non-realtime data traffic.

2. Description of the Related Art

There are various kinds of data traffic transmission and reception performed by wireless data communication nodes, such as web browsing, transmission and reception of streaming video, transmission and reception of electronic mails and transmission and reception of huge data files. Japanese Patent Application Laid-Open No. 2003-169363 and "Wireless LAN Medium Access Control (MAC) and Physical Layer (PHY) Specifications Amendment 8: Medium Access Control (MAC) Quality of Service Enhancements", IEEE Std. 802.11e, 2005 disclose the techniques of focusing attention on the degree of requiring the data traffic to be in realtime and allocating wireless resources (time, frequency, power) by priority to data traffic of higher priority that requires high level of realtime. In other words, in these techniques of related art, data traffic that is even of low priority and does not require realtime at all is inevitably allocated with wireless resources, and therefore, the wireless resources are consumed.

In this way, in the techniques of allocating wireless resources based on the priority set to the data traffic, the wireless resources are inevitably allocated to all data traffic sources according to the priority, irrespective of the network state. Therefore, even in the event of network congestions, wireless resources are allocated corresponding to data traffic that requires no realtime. For this reason, from the point of view of operators who operate wireless network (telecommunications carriers), it is not preferable that unurgent data traffic that requires no realtime needs to be held though there is congestion, and wireless resources, which should be allocated to other data traffic requiring realtime communication, are consumed in vain.

From the point of view of users that use wireless access network, wireless resources, which should be allocated to users of an application that requires realtime communication are undesirably allocated to a user of an application that does not require realtime communication that is, "unurgent application of which downloading may be finished at any future time". Further, a user of an application that does not require realtime communication may desire reduction in communication charge in return for the realtime communication.

To address this technical problem, the inventors of the present invention have invented a system for carrying out time-division transmission and reception of data traffic that does not require realtime using a off-peak time zone where there are sufficient wireless resources and filed a patent application (Japanese Patent Application No. 2009-70456).

The congestion level of wireless resources has geographical dependency. The congestion level of a business area is high for typical business hours (for example, 8 to 19 o'clock), while the congestion level of a residential area tends to be high after the business hours, in the middle of the night. Accordingly, for users who work in the business area and return to the residential area, the time zone between the midnight and morning is the off-peak time zone and for users who work based in the residential areas, the typical business hours are the off-peak time zone.

In this way, as the congestion level of wireless resources completely depends on behavior patterns of users, it is difficult to determine a fixed off-peak time zone of wireless resources in advance.

On the other hand, when an attention is focused on individual users, each user often repeats the same behavior pattern at intervals of 24 hours and daily variation of wireless resources at intervals of 24 hours can be often observed for every user. Accordingly, if the congestion level of wireless resources can be estimated in consideration of this periodicity, the communication time of non-realtime data can be optimized.

SUMMARY OF THE INVENTION

An object of the present invention is to provide a wireless node, in a system for carrying out transmission and reception of non-realtime data traffic using a time zone where there are sufficient wireless resources, which is capable of setting a communication time dynamically by considering daily variation relating to the congestion level of the wireless resources and learning the congestion level based on periodic use in an autonomous distributed manner.

To achieve this object, the present invention is characterized by taking the following measures in the wireless node that carries out reserved communications in an autonomous distributed manner by learning a time zone where there are sufficient wireless resources.

(1) The wireless node includes a unit for dividing predetermined one period into a plurality of time zones and setting at least one time zone to be a permission zone, a unit for allocating pre-assigned total number of communication times to the permission zone, a unit for determining a communication time of each of the allocated communications at the permission zone, a unit for carrying out communication at the communication time and detecting success or failure of line connection, a unit for estimating a congestion level of the wireless resource in each permission zone based on log data of which success or failure of line connection is recorded, and a unit for revising a part of communications allocated to a permission zone of high congestion level to another communication time zone based on an estimation result, wherein the unit for determining the communication time determines the communication time newly based on revised allocation and repeats such a process.

(2) The permission zone setting unit divides the predetermined one period equally at random and sets at least a part of the time zone to be the permission zone.

(3) The communication allocating unit allocates the pre-assigned total number of communication times to respective permission zones equally.

(4) The communication time determining unit determines communication times corresponding in number to the communications at the permission zone, at random.

(5) The predetermined one period is 24 hours.

(6) The allocation revising unit allocates a part of communications, which is already assigned to a permission zone where the congestion level exceeds a predetermined threshold, preferentially to another permission zone of lower congestion level.

The present invention can achieve the following effects.

(1) As each wireless node learns the congestion level in an autonomous distributed manner in consideration of periodic variation of the congestion level of the wireless resources according to the user behavior pattern and uses its result as a basis to determine the communication time dynamically, it is possible to optimize the communication time of non-realtime data for each wireless node.

(2) As the congestion level of wireless resources can be learnt in an autonomous distributed manner in consideration of the daily variation of 24 hours, it is possible to optimize the communication time of a user whose behavior pattern is changed at intervals of 24 hours.

(3) As the breakpoint of a permission zone where the communication time is set is determined at random for each wireless node, it is possible to differentiate the permission zones of the wireless nodes.

(4) As the allocated communication time is set at random at each permission zone, it is possible to reduce the possibility of overlapping the communication times of the wireless nodes of the same permission zones.

(5) As the communication time allocated to a permission zone of high congestion level of wireless resources is assigned to another permission zone, it is possible to improve the rate for succeeding in line connection of each communication time.

BRIEF DESCRIPTION OF THE DRAWINGS

FIG. 4 is a flowchart illustrating the operation of an embodiment of the present invention; and FIG. 5 is a view schematically illustrating an example of a method for revising a communication time.

DETAILED DESCRIPTION OF THE PREFERRED EMBODIMENTS

Figure 1:
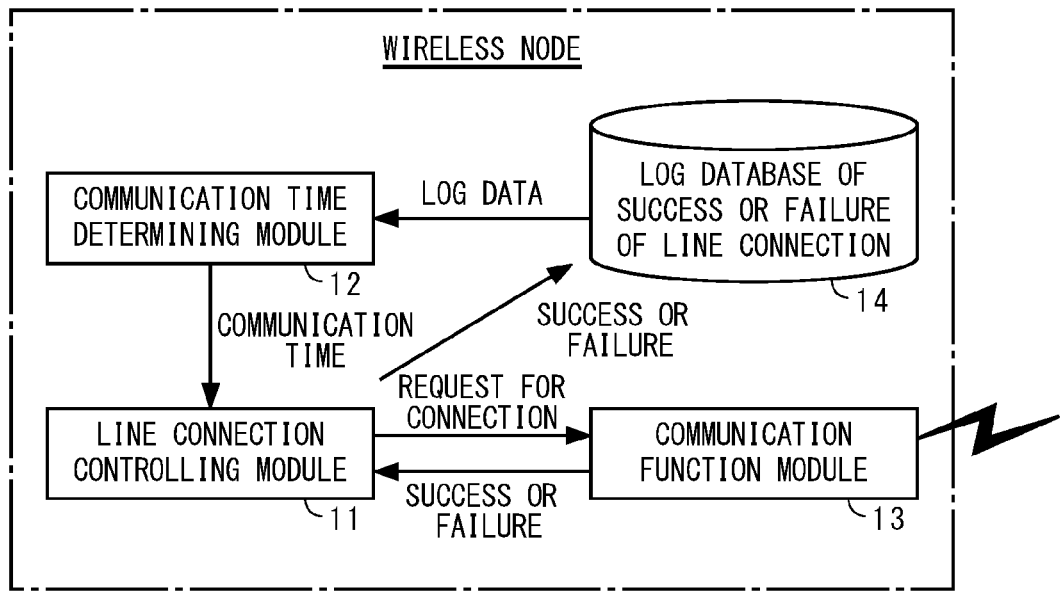
FIG. 1 is a functional block diagram illustrating a configuration of a wireless node according to the present invention.

FIG. 1 is a functional block diagram illustrating a configuration of a wireless node according to the present invention, and elements that are unnecessary for description of the present invention are not illustrated.

A line connection controlling module 11 requests a communication function module 13 for line connection at a communication time notified by a communication time determining module 12. The module 13 proceeds to line connection processing in response to the request for line connection and notifies the module 11 of success or failure of line connection. The module 11 notifies a log database 14 of success or failure of the line connection notified.

The log database 14 records success or failure of line connection notified in a database as log data and notifies the module 12 of the log data at predetermined time intervals. The module 12 revises a communication time based on the obtained log data and notifies the module 11 of the revised communication time.

Figure 2:
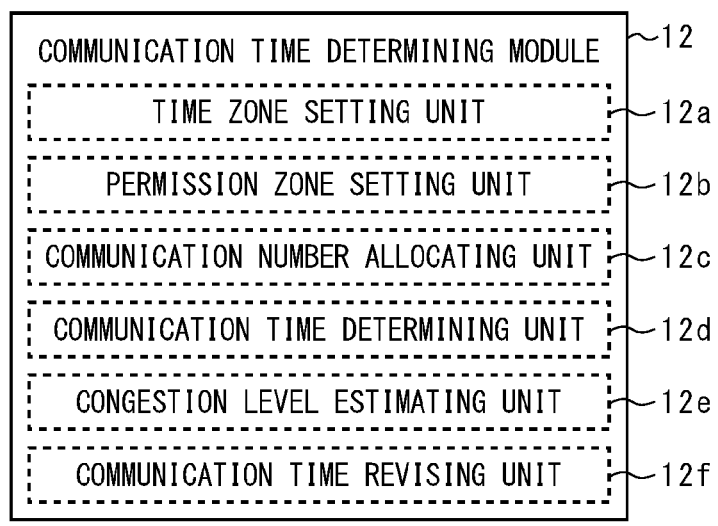
FIG. 2 is a block diagram illustrating a configuration of a communication time determining module.
Figure 3:
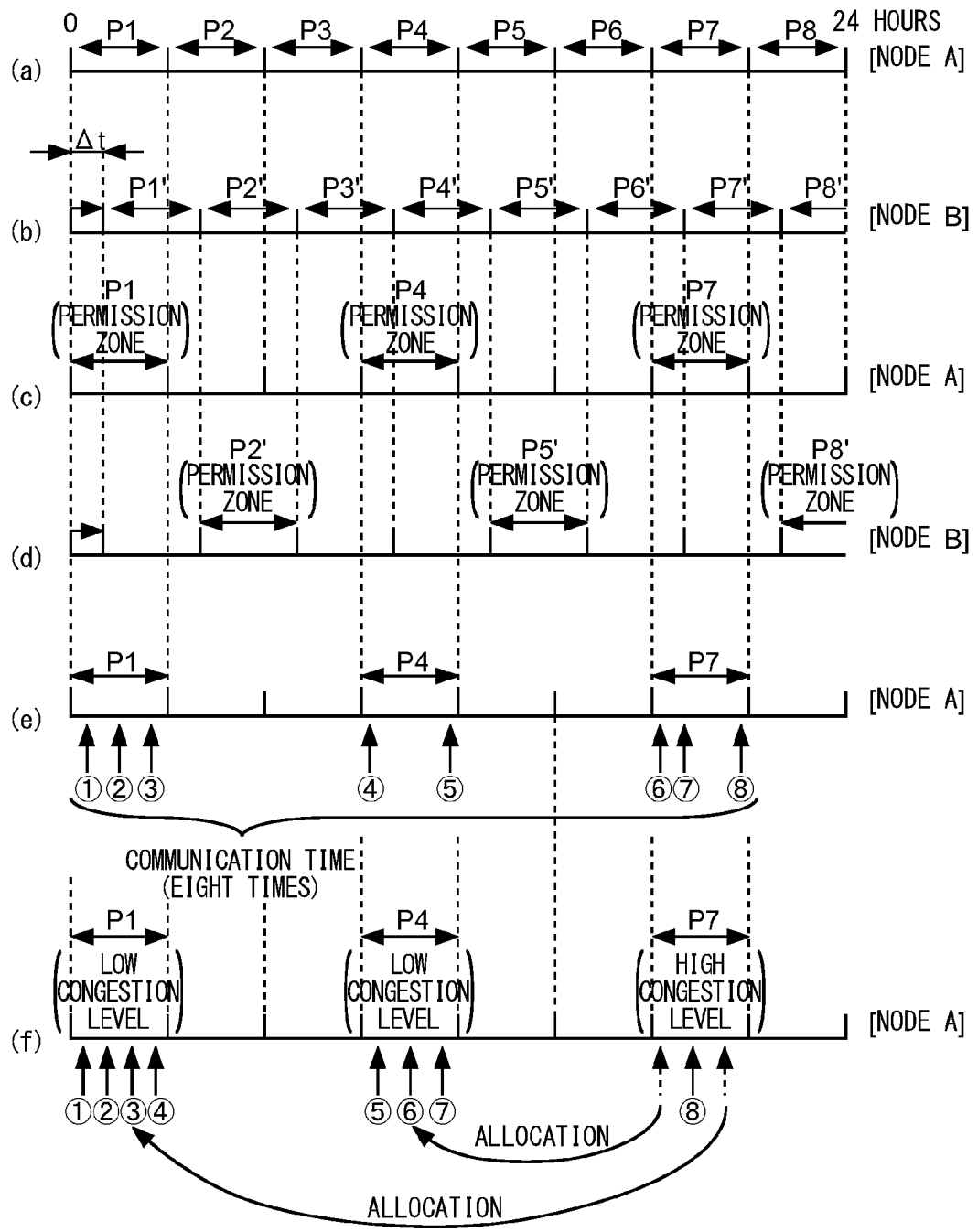
FIG. 3 is a view schematically illustrating a method for revising and allocating a communication time.

FIG. 2 is a block diagram illustrating a configuration of the above-mentioned module 12 and FIG. 3 is a view schematically illustrating a method for revising the communication time based on the log data and an initial setting method of the communication time.

In FIG. 2, a time zone setting unit 12a divides predetermined one period of each wireless node equally and virtually determines plural time zones px (p1, p2, ... ). In the present embodiment, it is assumed that one period is one day and 24 hours are divided into eight at random. Accordingly, in the present embodiment, the time zones set to each wireless node are not necessarily synchronized, and in a wireless node A, as illustrated in FIG. 3A, eight time zones p1, p2, ..., p8 are set based on the hour while in a wireless node B, as illustrated in FIG. 3B, eight time zones p1', p2', ..., p8' are set based on time Δt shifted from the hour.

A permission zone setting unit 12b sets at least a part of each time zone px to be a permission zone where communication is permitted. In the present embodiment, the number of permission zones is determined in advance (three in the present embodiment). For the wireless node A, three time zones p1, p4 and p7 are permission zones as illustrated in FIG. 3C and for the wireless node B, three time zones p2, p5 and p8 are permission zones as illustrated in FIG. 3D.

Here, it depends on the type of service a user of each wireless node enjoys and charge system which time zone is assigned to a permission zone for the wireless node. For a wireless node of a user under contract of a low-price service, each permission zone is shared among a large number of wireless nodes and for a wireless node of a user under contract of a high-price service, each permission zone is shared among a small number of wireless nodes so that services can be provided equitably.

A communication number allocating unit 12c allocates n times communications for one time period assigned to wireless nodes in advance to permission zones equally. A communication time determining unit 12d determines at random a corresponding number of communication times to the communications allocated to the permission zones. In the present embodiment, as illustrated in FIG. 3E, in the wireless node A, three times communications are assigned to the permission zone p1, two times communications are assigned to the permission zone p4, three times communications are assigned to the permission zone p7 and each communication time at each permission zone is determined at random.

The total number of communication times may be different among wireless nodes. For example, if the total number of communication times is differentiated according to contractual coverage for service or charge, it is possible to provide a service appropriate to user's request or charge.

A congestion level estimating unit 12e obtains log data relating to success and failure of line connection at each communication time from the log database 14 and estimates a congestion level of wireless resources based on a call loss rate (rate of failures in line connection at each permission zone). As illustrated in an example of FIG. 3F, a communication time revising unit 12f revises allocation of communications to each permission zone so that a part of communication times allocated to a permission zone of estimated high call loss rate and high congestion level is allocated to other permission zones of estimated low call loss rate and low congestion level equally or by predetermined priority.

FIG. 4 is a flowchart illustrating the operation according to an embodiment of the present invention. In step S1, in the module 12, a given time period (24 hours in the present embodiment) is divided equally at random by the above-mentioned time zone setting unit 12a to set breakpoints of respective time zones (FIGS. 3A and 3B). Then, the above-mentioned permission zone setting unit 12b classifies a part of the time zones px as permission zones (FIGS. 3C and 3D). In step S2, the above-mentioned communication allocating unit 12c allocates n times communications to each permission zone equally. In step S3, the above-mentioned communication time determining unit 12d determines at least one of the allocated communication times at each permission zone at random (FIG. 3E). The determined n times communication times are reported to the module 11.

In step S4, the module compares the notified communication time with the current time. When it is the communication time, the process proceeds to step S5 where the request for line connection is sent to the module 13. In response to this request for line connection, the module 13 executes predetermined call connection processing for a pre-registered destination. In step S6, it is determined whether the call connection has succeeded, and if yes, the process proceeds to step S7 and the communication is executed. In step S8, it is determined whether communication is finished, and when the communication is finished, the process proceeds to step S9. In step S9, a communication log that indicates that line connection has succeeded at this communication time is sent from the module 13 to the log database 14 via the module 11, and the log database records it as log data.

On the other hand, when it is determined in step S6 line connection has failed, the process proceeds to step S5 where connection processing is repeated until it gets to time-out in step S13. After time-out, the process proceeds to step S9. In step S9, a log that indicates the line connection has failed at this communication time is reported to the log database 14 where it is recorded as log data. In step S10, it is determined whether a predetermined learning time period is finished. Until the period is finished, the process goes back to step S4 and the above-mentioned learning processing is repeated.

Then, if it is determined that the learning time is finished in step S10, the process proceeds to step S11 where the congestion level of wireless resources is estimated for each permission zone. In the present embodiment, the above-mentioned congestion level estimating unit 12e obtains log data from the above-mentioned log database 14 and estimates that the time period when the line connection has succeeded at high rates is low in congestion level and the time period when the line connection has failed at high rates is high in congestion level. In step S12, the above-mentioned communication time revising unit 12e revises allocation of the communication time based on the estimation results of the congestion level.

In the present embodiment, the congestion level of wireless resources (call loss rate in the present embodiment) is compared with a predetermined threshold, and as illustrated in FIG. 3F, at the permission zone where the call loss rate exceeds the threshold, the number of communication times is reduced. The reduced number of communication times is equally divided into other permission zones. Otherwise, more communications may be preferentially assigned to a permission zone with a lower congestion level.

FIG. 5 is a view schematically illustrating another method for revising the communication time. It is assumed that, as illustrated in FIG. 5A, although twelve communication times are allocated to three permission zones #1, #2, #3, line connection is performed within first 24 hours, and the congestion levels of the permission zones #1, #2 exceed the threshold. Here, the communication chances of the permission zones #1, #2 are reduced by half into two and in the next 24 hours, as illustrated in FIG. 5B, eight communication times are allocated to the permission zones #1, #2, #3 and line connection is performed.

As a result, as marked by "x" in FIG. 5B, when out of eight communication times, one shows failure in line connection, here, a difference between the originally set number of connections, twelve, and the actual number of connections is obtained (=five) and these five communication times corresponding to this difference are allocated equally to the permission zones of low congestion level. In the example of FIG. 5, as illustrated in FIG. 5C, five communication times are added to the permission zone #3.

When revising of the number of communication times of each permission zone is finished, the process returns to step S3, where the revised number of calls is used as a basis to determine each call time for each permission zone at random by the above-mentioned communication time determining unit 12c and notified the module 11. After that, the same processing is performed repeatedly.

Here, the above-described embodiment has been described by way of example where the one period is one day and 24 hours are divided into eight and a part of them is used as a permission zone. However, this is not intended for limiting the present invention, and all time zones equally divided may be used as permission zones.

What is claimed is:

1. A wireless node which determines a time zone where there are sufficient wireless resources and performs reserved communications in an autonomous distributed manner, comprising: a permission zone setting unit for dividing predetermined one period into a plurality of time zones and setting at least one time zone to be a permission zone; a communication allocating unit for allocating pre-assigned total number of communication times to the permission zone; a communication time determining unit for determining a communication time of each of the allocated communications in each permission zone; a communication function unit for carrying out communication at the communication time and detecting success or failure of line connection; a unit for estimating a congestion level of the wireless resource in each permission zone based on log data of which success or failure of line connection is recorded; and an allocation revising unit for revising a part of communications allocated to a permission zone of high congestion level to another communication time zone based on an estimation result, wherein the communication time determining unit determines the communication time newly based on revised allocation and repeats such a process; wherein the permission zone setting unit divides the predetermined one period equally at random and sets at least a part of the time zone to be the permission zone.

2. The wireless node according to claim 1, wherein the communication allocating unit allocates the pre-assigned total number of communication times to respective permission zones equally.

3. The wireless node according to claim 1, wherein the communication time determining unit determines communication times corresponding in number to the communications at the permission zone, at random.

4. The wireless node according to claim 1, wherein the predetermined one period is 24 hours.

5. The wireless node according to claim 1, wherein the allocation revising unit allocates a part of communications, which is already assigned to a permission zone where the congestion level exceeds a predetermined threshold, preferentially to another permission zone of lower congestion level.

* * * * *